United States Patent Office 3,763,174
Patented Oct. 2, 1973

3,763,174
2-(3,4-DICHLOROANILINO)QUINOLIZINIUM BROMIDE
Robert J. Alaimo and Marvin M. Goldenberg, Norwich, N.Y., assignors to Morton-Norwich Products, Inc.
No Drawing. Filed Aug. 30, 1971, Ser. No. 176,312
Int. Cl. C07d 39/12
U.S. Cl. 260—296 B
1 Claim

ABSTRACT OF THE DISCLOSURE 2-(3,4 - dichloroanilino)quinolizinium bromide is an effective antispasmodic, antiulcerogenic and anti-inflammatory drug.

---

This invention relates to the chemical compound 2-(3,4-dichloroanilino)quinolizinium bromide and a method for preparing it.

The compound of this invention possesses valuable pharmacologic properties. When administered intravenously in distilled water to dogs in a dose of from 5–10 mg./kg., it inhibits contractions of the colon produced by intermittent pelvic nerve electrical stimulation or those elicited by administration of spasmogenic substances such as acetylcholine, histamine or serotonin thus displaying antispasmodic properties.

When administered per os to pylorus ligated rats in doses of from 50–150 mg./kg., free acid and total titratable acid secretions are suppressed. At a dose of 100 mg./kg. per os to similar rats, formation of ulcers is prevented and a reduction of aspirin-induced ulceration in the stomach is elicited.

When administered at a dose of 100 mg./kg. per os to rats one hour prior to exposing these rats to the standard rat foot test for detecting anti-inflammatory activity [Winter et al., P.S.E.B.M. 114:544 (1964)] carrageenin induced edema is inhibited.

The method of making the compound of this invention consists in bringing together 2-bromoquinolizinium bromide and 3,4-dichloroaniline in the presence of a solvent such as ethanol. It is illustrated by this example:

2-(3,4-dichloroanilino)quinolizinium bromide

To 600 ml. of ethanol was added 2-bromoquinolizinium bromide (45 g. 0.15 mole) and (49 g. 0.30 mole) of 3,4-dichloroaniline. The mixture was stirred under reflux for 4 hours, then treated with Darco and filtered. The hot solution was chilled to precipitate the product (35 g. 64%).

Recrystallization from ethanol (Darco) gave a material which melted at 264–265°.

*Analysis.*—Calcd. for $C_{15}H_{11}BrCl_2N_2$ (percent): C, 48.68; H, 3.00; N, 7.57. Found (percent): C, 48.97; H, 2.97; N, 7.53.

What is claimed is:
1. 2-(3,4-dichloroanilino)quinolizinium bromide.

References Cited
UNITED STATES PATENTS
3,517,019   6/1970   Alaimo _____ 260—294.8

OTHER REFERENCES
Klingsberg, "Pyridine and Its Derivatives, Part Two," Inter-Science Publishers, Inc., New York (1961), p. 353.

HENRY R. JILES, Primary Examiner
G. T. TODD, Assistant Examiner

U.S. Cl. X.R.
424—263